(12) United States Patent
Tilmans et al.

(10) Patent No.: US 7,439,117 B2
(45) Date of Patent: Oct. 21, 2008

(54) METHOD FOR DESIGNING A MICRO ELECTROMECHANICAL DEVICE WITH REDUCED SELF-ACTUATION

(75) Inventors: Hendrikus Tilmans, Maasmechelen (BE); Xavier Rottenberg, Schaarbeek (BE)

(73) Assignee: Interuniversitair Microelektronica Centrum (IMEC), Leuven (BE)

( * ) Notice: Subject to any disclaimer, the term of this patent is extended or adjusted under 35 U.S.C. 154(b) by 201 days.

(21) Appl. No.: 11/317,370

(22) Filed: Dec. 23, 2005

(65) Prior Publication Data

US 2006/0168788 A1    Aug. 3, 2006

Related U.S. Application Data

(60) Provisional application No. 60/639,748, filed on Dec. 27, 2004.

(30) Foreign Application Priority Data

Jan. 10, 2005    (EP) .................................. 05103893

(51) Int. Cl.
*H01L 21/336* (2006.01)
*H01L 21/8234* (2006.01)

(52) U.S. Cl. ...................... 438/197; 438/133; 438/381; 257/E21.17; 257/E21.051; 257/E21.278; 257/E21.293; 257/E21.645

(58) Field of Classification Search ................ 438/197, 438/133, 142, 240, 238, 257, 381, 289, 680, 438/681, 240.238
See application file for complete search history.

(56) References Cited

U.S. PATENT DOCUMENTS 7,145,284 B2 * 12/2006 Ikehashi ..................... 310/348

2003/0042117 A1 * 3/2003 Ma .............................. 200/181
2004/0000696 A1   1/2004 Ma et al. ..................... 257/415

FOREIGN PATENT DOCUMENTS

| EP | 0 709 911 A2 | 5/1996 |
| EP | 1 398 811 A2 | 3/2004 |
| WO | WO 02/01584 A1 | 1/2002 |

OTHER PUBLICATIONS

European Search Report 05103893.3—2214, dated Dec. 7, 2005.
Rottenberg et al., "MEMS Capacitive Series Switches: Optimal Test Vehicles for the RF Self-Biasing Phenomenon," 2005 IEEE, XP-002370641, pp. 147-150.
Ducarouge et al., "Power Capabilities of RF MEMS," 2004 IEEE, XP002370583, pp. 65-70.
European Search Report dated May 11, 2006, 05112976.5-2214.
Rottenberg et al., "Modelling of the RF Self-Actuation of Electrostatic RF-MEMS Devices," 2004 IEEE, XP-002370640, pp. 245-248.
Peroulis et al., "RF MEMS Switches with Enhance Power-Handling Capabilities," 2004 IEEE, XP-002370637, pp. 59-68.

* cited by examiner

*Primary Examiner*—David Nhu
(74) *Attorney, Agent, or Firm*—McDonnell Boehnen Hulbert & Berghoff LLP

(57) ABSTRACT

A method is described for designing a micro electromechanical device in which the risk of self-actuation of the device in use is reduced. The method includes locating a first conductor in a plane and locating a second conductor with its collapsible portion at a predetermined distance above the plane. The method also includes laterally offsetting the first conductor by a predetermined distance from a region of maximum actuation liability. The region of maximum actuation liability is where an attraction force to be applied to activate the device is at a minimum.

18 Claims, 6 Drawing Sheets

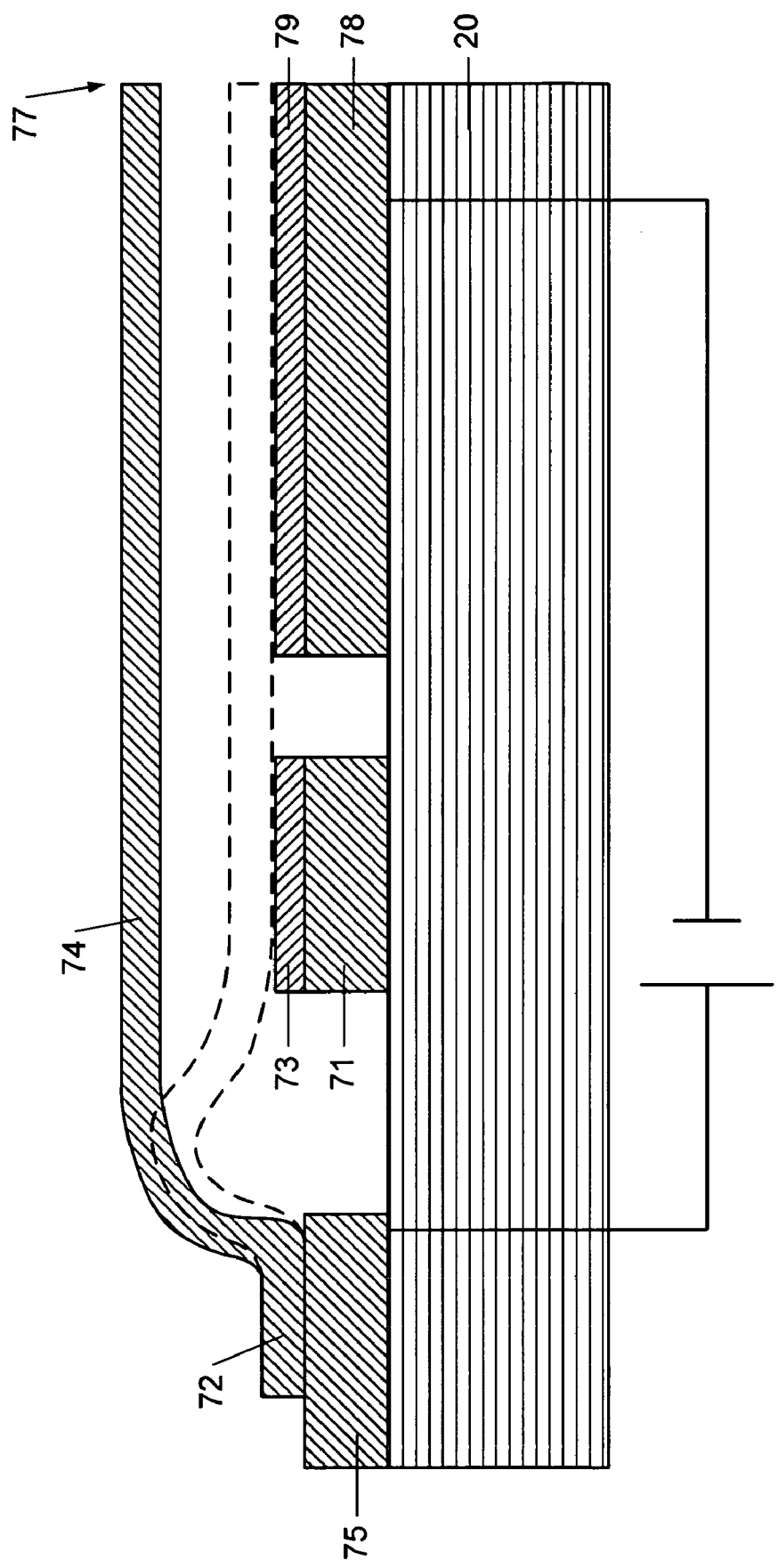

METHOD FOR DESIGNING A MICRO ELECTROMECHANICAL DEVICE WITH REDUCED SELF-ACTUATION

RELATED APPLICATIONS

The present patent application claims priority under 35 U.S.C. § 119(e) to U.S. Provisional Patent Application Ser. No. 60/639,748, which was filed Dec. 27, 2004. The present patent application also claims priority under 35 U.S.C. § 119(b) to European Patent Application No. EP 05103893.3, which was filed Jan. 10, 2005. The full disclosure of U.S. Provisional Patent Application Ser. No. 60/639,748 and the full disclosure of European Patent Application No. EP 05103893.3 are incorporated herein by reference.

FIELD

The present invention relates to a method for designing a micro electromechanical (MEMS) device.

BACKGROUND

RF-MEMS switching devices have two stable states just like semiconductor RF switches (for example, PIN diodes or GaAs FET switches). Switching between the two states is achieved through the mechanical displacement of a freely movable structural member (i.e., the armature). The displacement is induced via a micro-actuator for which various actuation mechanisms exist including, electrostatic, electrothermal, piezoelectric, and electromagnetic means.

The majority of RF-MEMS switches rely on electrostatic actuation, which is based on the attractive Coulomb force existing between charges of opposite polarity. Electrostatic drive offers extremely low power consumption, in which power is consumed only during switching (compare a digital inverter stage). Other advantages of using electrostatic actuation are the relatively simple fabrication technology, which is much simpler as compared to, for instance, electromagnetic excitation; the high degree of compatibility with a standard IC process line; and the ease of integration with planar and micro-strip transmission lines.

RF-MEMS switches implementing electrostatic actuation are currently the best-developed RF-MEMS component and have been demonstrated on a laboratory scale by a number of companies and academic institutions from all over the world. A first clear wave of scientific publications and patents appeared halfway through the nineties, with clearly increased interest marked since the late nineties. The literature undoubtedly indicates the key advantages of RF-MEMS switches as compared to semiconductor solutions (e.g., GaAs FETs, PIN diodes).

However, known RF-MEMS devices have one major disadvantage, namely the risk of self-actuation when the RF signal reaches a high power and generates an RF induced force.

From U.S. Patent Application Ser. No. 2003/042117, U.S. Patent Application Ser. No. 2004/000696, and European Application No. EP 0709911, MEMS devices are known in which there is a lateral offset between a region of maximum actuation liability on the collapsible portion of the device (bridge or cantilever structure) and a conductor on which a signal can be applied. This lateral offset results from the fact that the devices are designed with the goal of achieving a reduced actuation voltage.

SUMMARY

A method is described for designing a micro electromechanical device in which the risk of self-actuation of the device in use is reduced. The micro electromechanical device which is designed according to the methods described herein may be a switchable capacitor, i.e. a capacitor with two steady states; a variable capacitor, i.e. a capacitor with controllable variable capacitance; an ohmic relay; or any other micro electromechanical device known to the person skilled in the art.

The method for designing a micro electromechanical device includes the following steps. A plane is defined, in which a first conductor is located. A second conductor having a collapsible portion is located with at least its collapsible portion at a predetermined distance above the plane, such that the orthogonal projection of the collapsible portion onto the plane defines a principal actuation area on the plane through which the first conductor extends. In use, it is the collapsible portion of the second conductor which may be attracted by the first conductor as a result of RF induced forces, i.e., attraction forces induced by an RF signal. As used herein, RF can mean any radio frequency signal of any frequency with a preference towards frequencies between 100 MHz and 100 GHz, but not limited thereto.

In a next step, characteristics of the collapsible portion are determined in such a way that in use the collapsible portion may be movable between a distant position further from the principal actuation area and a proximate position closer to the principal actuation area, and that the movement of the collapsible portion will be actuatable by applying an attraction force within the principal actuation area. The characteristics of the collapsible portion are furthermore determined in such a way that it will show a variable actuation liability in longitudinal direction, with a region of maximum actuation liability where the attraction force to be applied for actuation is a minimum over the whole principal actuation area. Then, a precondition is determined as a function of the RF induced attraction force, which may occur in use between the first and second conductors, and which the device has to be able to withstand. In a following step, the first conductor is laterally offset by a predetermined distance from the region of maximum actuation liability, the distance being determined such that the precondition is met.

As a result of the lateral offset, the first conductor of the device is located with respect to the second conductor such that in order to actuate the collapsible portion by means of the first conductor, an attraction force above the theoretical minimum attraction force has to be generated. This theoretical minimum attraction force is the attraction force applied to the ideal position for actuation in the plane defined by the first conductor, namely underneath the region of maximum actuation liability. Due to the predetermined position of the first conductor—laterally offset from the region of maximum actuation liability and, thus, underneath a region of the collapsible portion which is less liable to actuation—actuation by means of the first conductor requires at least a higher attraction force than the minimum.

Furthermore, the offset has a predetermined distance, which is determined in view of the precondition, namely that the device has to be able to withstand a given RF induced attraction force which may occur in use between the first and second conductors. In this way, the risk of self-actuation of the device in use can be substantially reduced, since the device is designed for withstanding RF induced forces at least below a given value, which is higher than the theoretical minimum attraction force.

In the prior art devices described above, the offset results from the devices being designed for achieving a lower actuation voltage, or more in general actuation at a reduced force. This involves an adaptation of the collapsible portion of the devices, such as for example applying a weaker extension on the collapsible portion over the actuation electrode, thereby changing the actuation characteristics of the device, but this has substantially no effect on the RF induced attraction forces that these devices can withstand.

With the methods described herein, the design is carried out in view of being able to withstand higher RF induced attraction forces, rather than in view of achieving actuation at a reduced attraction force. This can lead to devices that are not only able to withstand higher RF induced attraction forces, but also to devices by means of which more RF power is transportable via one of the conductors with respect to the prior art.

The RF induced force that is present in the device in use and involves the risk of self-actuation, may for example be caused by one of the conductors being an RF signal line for transporting RF signals, while the other conductor is connected to ground. Both the first conductor and the second conductor can form the RF signal line. The RF induced force may however also result from other causes. For example, the conductors together may also form an interruptible RF signal line with the collapsible portion interrupting the RF signal line when in the distant position.

In a preferred example, the method further comprises locating an actuation electrode within the principal actuation area, adapted for in use actuating the collapsible portion by means of a DC voltage difference, which is applied between the actuation electrode and the second conductor (or by means of a low frequency voltage). This actuation is the desired actuation, not the self-actuation of the device of the invention. This DC voltage difference generates the attraction force for moving the collapsible portion between the distant and proximate positions.

This electrostatic actuation scheme is preferred because of its advantages such as, for example, the low insertion loss, the extremely low stand-by power consumption, the wide bandwidth, and the excellent linearity characteristics (minimal inter-modulation distortion). Other distinct advantages of the electrostatic actuation scheme that may prove very valuable are the integration capability with other high quality passives (high-Q inductors, varicaps, filter structures), the flexible choice of the substrate (which merely serves as a platform for the device), and, explicitly for relay configurations, the biasing scheme, which, for complex systems like large switching networks, can be greatly simplified. However, other actuation schemes may also be used, such as, for example, with electrothermal, piezoelectric, electromagnetic means, or any other known to the person skilled in the art.

Preferably, the first conductor is laterally offset from the region of maximum actuation liability over such a distance that the DC voltage difference at which the collapsible portion is actuatable by means of the first conductor is not only above the minimum, but also above a given, predetermined threshold. This means that a sub-region of the collapsible portion is defined where the DC voltage difference to be applied for actuation is below the predetermined threshold and that the first conductor is located laterally offset from this sub-region. Of course, this sub-region comprises the region of maximum actuation liability.

The threshold voltage difference can be chosen as a function of the RF power to be transmitted and the device can be designed accordingly with a corresponding lateral offset of the first conductor. As a result, the risk of self-actuation of the device can be minimized. In this embodiment, the precondition is that the threshold is above a DC equivalent of the RF induced force that may be experienced by the device in use.

In one advantageous example of the device designed with the methods described herein, the actuation electrode is formed by the first conductor and no further actuation electrode is provided in the principal actuation area. This example is advantageous if it is desired that the device can only be actuated by a high DC voltage difference between the first conductor and the second conductor.

In another advantageous example of the device designed with the methods described herein, the first conductor is accompanied by a separate actuation electrode that is closer to the region of maximum actuation liability, so that actuation of the device can be effected by means of this separate actuation electrode. Preferably, but not necessarily, this separate actuation electrode is located such that it extends underneath the region of maximum actuation liability, so that the device can be actuated with a minimum DC voltage difference.

In another advantageous example of the device designed with the methods described herein, the first conductor is flanked by a pair of separate actuation electrodes, i.e., one activation electrode on each side of the first conductor within the principal actuation area. This has the advantage that the stability of the proximate state of the collapsible portion can be enhanced.

Each of the electrodes, i.e., the first conductor and, if present, any separate actuation electrode may or may not be covered by a dielectric layer on the side of the collapsible portion of the second conductor. This dielectric layer then provides a contact surface (except when another layer is deposited on top of the dielectric layer or when the distance between the conductors is too large for contact) for the collapsible portion in the proximate position with the thickness of the layer determining the capacitance of the device in this state. So the dielectric layer can function to predetermine the capacitance of the device.

Furthermore, a floating contact may be deposited on top of one or more of the dielectric layers on top of the electrodes. This floating contact may in turn be provided with a protrusion extending towards the collapsible portion. The advantages of such a floating contact, with or without protrusion, are known from European Patent Application No. EP 1398811, which is hereby incorporated by reference in its entirety.

The collapsible portion of the second conductor can, for example, be formed by an armature or any other equivalent structure known to the person skilled in the art. This armature can be for example a bridge element extending between two fixed supports (generally, but not exclusively, a shunt switch) or a cantilever element extending from one fixed support (generally, but not exclusively, a series switch).

The invention further relates to a device comprising a pair of micro electromechanical devices of the bridge type with a common first conductor, but with a lateral offset in opposite directions. This means that, for example, in an embodiment with substantially symmetrical bridge elements, the first bridge element is offset to the left and the second bridge element to the right with respect to the first conductor, or vice versa. Such a structure is one example of overcoming signal disturbances which may be caused by an asymmetrical structure of the micro electromechanical device, but other solutions to this problem are possible. Each of the micro electromechanical devices may further show any of the features described herein with respect to the method of the invention.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIGS. 8-12 show additional devices designed with the method, according to an example.

DETAILED DESCRIPTION

Figure 1:
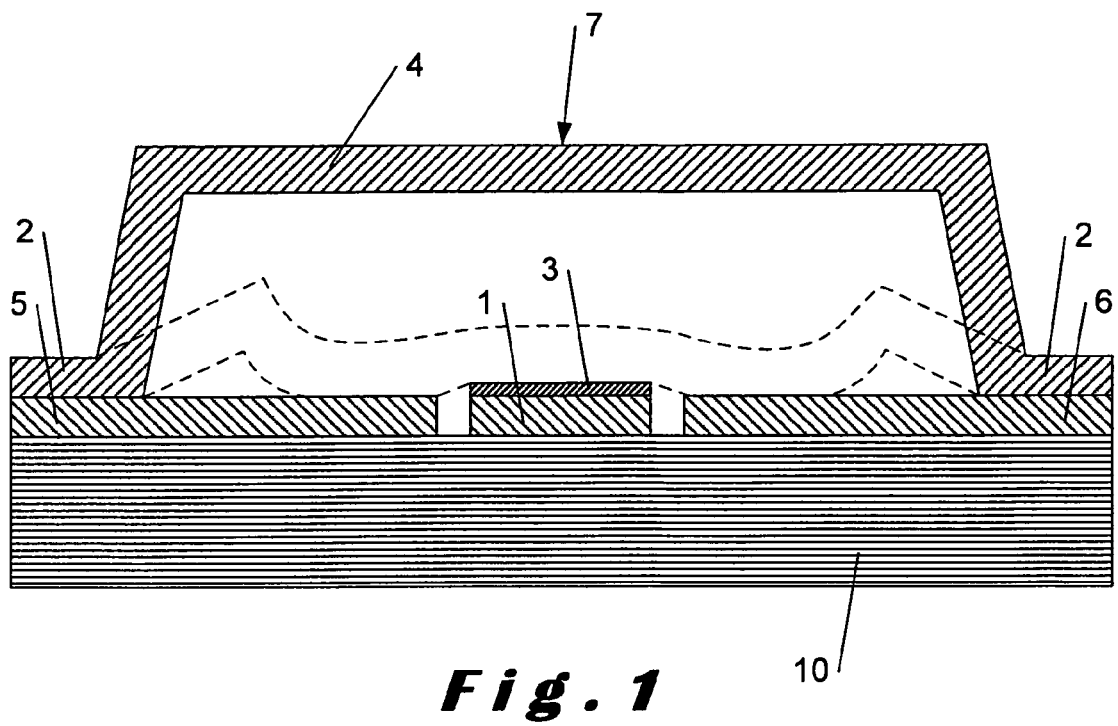
FIG. 1 shows a cross section of a prior art device.

The present invention will be described with respect to particular examples and with reference to certain drawings, but the invention is not limited thereto and is only limited by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third, and the like in the description and in the claims, are used for distinguishing between similar elements and not necessarily for describing a sequential or chronological order. It is to be understood that the terms so used are interchangeable under appropriate circumstances and that the examples described herein are capable of operation in other sequences than described or illustrated herein.

Moreover, the terms top, bottom, over, under, and the like in the description and the claims are used for descriptive purposes and not necessarily for describing relative positions. It is to be understood that the terms so used are interchangeable under appropriate circumstances and that the examples described herein are capable of operation in other orientations than described or illustrated herein.

The drawings provide examples for shunt switches and series switches, which have corresponding features of a bridge and a cantilever respectively, with relay actuation or actuation in zones attached to the floating electrode area, and provides devices for application in the field of switchable capacitors and capacitive switches. However, the invention is not limited to shunt switches and series switches, but is also applicable to variable capacitance devices and generally to all micro electromechanical devices in which RF induced forces occur.

The prior art MEMS device shown in FIG. 1 is a capacitive shunt switch. It is formed on a substrate 10 and comprises the following components: a first conductor 1, which is an RF signal line with a dielectric layer 3 on top, and a second conductor 2 with a collapsible portion 4 extending between two fixed supports 5, 6 and overhanging the first conductor 1. The collapsible portion 4 is movable between a distant position as shown in full lines and a proximate position as shown in broken lines. In the proximate position, the collapsible portion 4 lies on top of the dielectric layer 3. The RF signal line 1 is located in the middle underneath the collapsible portion 4, which has a symmetrical structure with a constant thickness so that its central region 7 is most sensitive to attraction forces. As a result, the signal line 1 is in the ideal position for actuation of the collapsible portion: right underneath the region 7 of maximum actuation liability.

Figure 2:
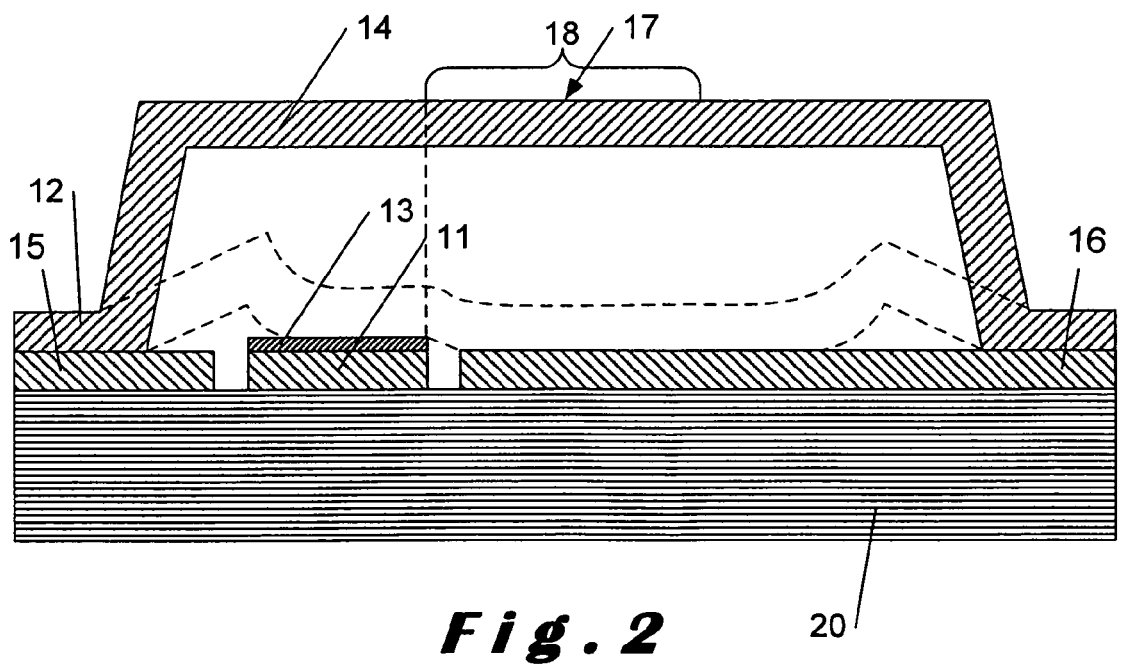
FIG. 2 shows a cross section of a device designed with a method for designing a micro electromechanical device with reduced self-actuation, according to an example.

FIG. 2 depicts a MEMS device that is designed according to the methods described herein. The MEMS device is also a shunt switch. It is formed on a substrate 20 and comprises the following components: a first conductor 11 with a dielectric layer 13 on top and a second conductor 12 with a collapsible portion 14 extending between two fixed supports 15, 16 and overhanging the first conductor 11. The collapsible portion 14 is movable between a distant position as shown in full lines and a proximate position as shown in broken lines. It should be noted that the deformation of the collapsible portion 14 in the drawings does not represent the situation in reality but is given as an example for clarification purposes.

In the proximate position, the collapsible portion 14 lies on top of the dielectric layer 13, whose thickness determines the capacitance in the proximate state. The collapsible portion 14 has a symmetrical structure with a constant thickness so that its central region 17 is most sensitive to attraction forces. The first conductor 11 is located underneath the collapsible portion 14, but is laterally offset by a predetermined distance from the central region 17 of the collapsible portion 14. This distance is determined by means of a precondition that the device has to be able to withstand RF induced attraction forces that may occur in use between the first and second conductors 11, 12.

The device of FIG. 2 is designed, for example, but not necessarily on a computer, according to the method as follows. The first conductor 11 is given a location in a plane, which may, for example, correspond to the top surface of the substrate 20 in the finished device. The second conductor 12 is placed with at least its collapsible portion 14 at a predetermined distance above the plane of the first conductor 11, such that the orthogonal projection of the collapsible portion onto the plane defines a principal actuation area through which the first conductor 11 extends. In use, it is the collapsible portion 14 of the second conductor 12 that may be attracted by the first conductor 11 as a result of RF induced forces, i.e., attraction forces induced by an RF signal present on either the first or the second conductor.

In a next step, characteristics of the collapsible portion 14 are determined in order to fulfill the requirements which have to be met by the collapsible portion 14 in the finished device. Such requirements are, for example, that the collapsible portion 14 has to be movable between the distant position and the proximate position, and that the movement of the collapsible portion has to be actuatable by applying an attraction force within the principal actuation area. Another characteristic is that it will show a variable actuation liability in longitudinal direction, so that there is with a region of maximum actuation liability 17 where the attraction force to be applied for actuation is a minimum over the whole principal actuation area.

Then, a precondition is determined in function of the RF induced attraction force which may in use occur between the first and second conductors 11, 12 and which the device has to be able to withstand. The distance by which the first conductor 11 has to be laterally offset from the region 17 is calculated on the basis of this precondition. Then, the first conductor 11 is moved in the principal actuation area on the plane at least by the calculated distance. This will ensure that the precondition is met by the finished device, which has the effect that the risk of self-actuation of the finished device in use can be substantially reduced.

In a further design step, the thickness of the dielectric 13 on top of the first conductor 11 is determined in function of the desired capacitance of the device in use in the collapsed state.

As a result of the offset, the first conductor 11 is in a non-ideal position for actuation of the collapsible portion 14. In order to move the collapsible portion 14 to the proximate position, a DC voltage difference can be applied between the first and second conductors 11, 12. Because of the non-ideal actuation position of the first conductor 11, this DC voltage difference and, hence the attraction force generated by it, are above the minimum of the device and furthermore above a given value, namely the DC equivalent of a given RF induced attraction force that may occur in use between the first and second conductors 11, 12, and that the device has to be able to withstand according to the precondition in the design stage.

The device is actuatable at the minimum DC voltage in the middle of the area defined by the orthogonal projection of the collapsible portion 14 onto the plane of the first conductor 11, i.e., right underneath the region 17 of the collapsible portion 14 most liable to actuation. The orthogonal projection area is herein called the "principal actuation area."

The fact that the above mentioned precondition is met is shown in FIG. 2 in which the first conductor 11 is offset from a sub-region 18 surrounding the central region 17 of the collapsible portion 14. Underneath the sub-region 18, an attraction force above a given threshold strength would actuate the collapsible region. Dislocating the first conductor 11 from this sub-region 18, thus, has the effect that the DC voltage difference and, consequently the RF power at which actuation occurs, is not only above the minimum, but also above a given threshold which is predetermined by the sub-region 18.

An RF-MEMS device is typically designed for carrying RF signals above its lowest natural frequency and not at one of its higher natural frequencies. The methods described herein can, however, be applied to MEMS devices for any RF frequency, preferably within the range 100 MHz to 100 GHz, but not limited thereto. A "natural frequency" is in the art also called a "mechanical resonance frequency."

The substrate 20 may for example be, but is not limited to, glass, high resistive semiconductors, ceramic materials, or any low loss or very low loss, non-conductive material. With low loss is meant that the substrate 20 may have a loss tangent which is smaller than 0.001. With very low loss is meant that the substrate 20 may have a loss tangent which is smaller than 0.0001.

The first conductor 11, which may be in a coplanar waveguide (CPW) line corresponding to a signal line, may consist of a conductive material such as, for example, a metal, a semiconductor material, or a conductive polymer. Any suitable signal feeding system may be used, e.g., besides a CPW geometry, also microstrip, stripline, or CPW with grounded backside geometries may be used. The first conductor 11 may be produced by means of suitable techniques for the deposition of a conductive material such as, but not limited to, sputtering, plating, printing, or spincoating. The thickness of the first conductor 11, as well as the ground lines present in some of the examples (see further), may preferably be between 0.1 µm and 10 µm, and more preferably the thickness of the first conductor 11 may be between 1 µm and 3 µm.

The dielectric layer 13 may consist of a dielectric material such as, but not limited to, inorganic (e.g., $SiO_2$, $Ta_2O_5$, $Si_3N_4$) or organic (polymer) materials. The dielectric layer 13 may preferably have a thickness between 0.01 µm and 100 µm. More preferably, the dielectric layer 13 may have a thickness between 0.01 µm and 10 µm. Most preferably, the dielectric layer 13 may have a thickness between 0.1 µm and 1 µm.

In order to increase the downstate capacitance (see further), a thin dielectric layer 13 may be preferred over a thick one. The dielectric layer 13 may, however, not be too thin in order to avoid breakdown of the capacitor. Breakdown of the capacitor depends on the material used to form the dielectric layer 13 and on the applied voltage. Therefore, the minimum allowable thickness to avoid breakdown of the capacitor depends on the material used to form the dielectric layer 13. Typical breakdown voltages are in the order of $10^8$-$10^9$ Volts per meter.

The dielectric layer 13 may be deposited onto at least part of the bottom electrode 11. Different processes may be used for producing the dielectric layer 13, which processes may consist of different steps. Such steps can comprise, but are not limited to, steps like for example sputtering, anodization, or PECVD (Plasma Enhanced Chemical Vapour Deposition). Furthermore, the dielectric layer 13 may include holes and may have different shapes and sizes.

The collapsible portion 14, which is also called the armature, may be formed by first depositing a sacrificial layer (not shown) on top of this structure on which, in a next step, the armature 14 may be formed. The sacrificial layer should be selectively removable. The sacrificial layer may for example be a polymer, such as, for example, BCB, polyimide, or other suitable polymers used as photoresists in microphotolithography and known to the skilled person. The sacrificial layer may as well be an oxide as, for instance, a silicon oxide, a nitride, a metal, semiconductor material, SiGe, and so on.

The thickness of the sacrificial layer determines the distance between the armature 14 and the dielectric layer 13. Preferably, the thickness of the sacrificial layer may be between 0.8 µm and 10 µm. More preferably, the thickness may be between 1 µm and 5 µm. Most preferably, the thickness of the sacrificial layer may be between 2 µm and 4 µm.

The armature 14, which may be deposited on top of the sacrificial layer by, for example, sputtering, plating, printing, or spincoating, may consist of, for example, a conductive material such as a metal (e.g., Au, Al, Cu, or other suitable metals), a semiconductor material (e.g., Si, Ge, SiGe, GaAs), a conductive polymer, or any other suitable conductive material. Openings in the armature 14 may be formed by means of, for example, an etching process. During the same etching process, the sacrificial layer may be removed. Typically, an additional step is performed for removing the sacrificial material, through the formed openings.

In FIG. 2, the armature 14 has a substantially symmetrical structure with the region 17 of maximum actuation liability substantially in the middle. However, the armature 14 may also be designed as an asymmetrical structure, with the region 17 of maximum actuation liability offset from the middle, in which case the first conductor 11 may for example be located in the middle or offset in opposite direction. For example, the armature 14 may have a variable width or thickness in longitudinal direction (i.e., going from left to right in FIG. 2), or be provided with a stiffening layer over a portion of its length, etc.

The orthogonal projection of the collapsible portion of armature 14 onto the plane of the first conductor 11 is herein called the "principal actuation area" for the following reason: the collapsible portion 14 is not only actuatable by electrodes within this area but, for example, also by electrodes adjacent the longitudinal edges of this area. In other words, the principal actuation area is not the only area where actuation electrodes may be located.

Figure 3:
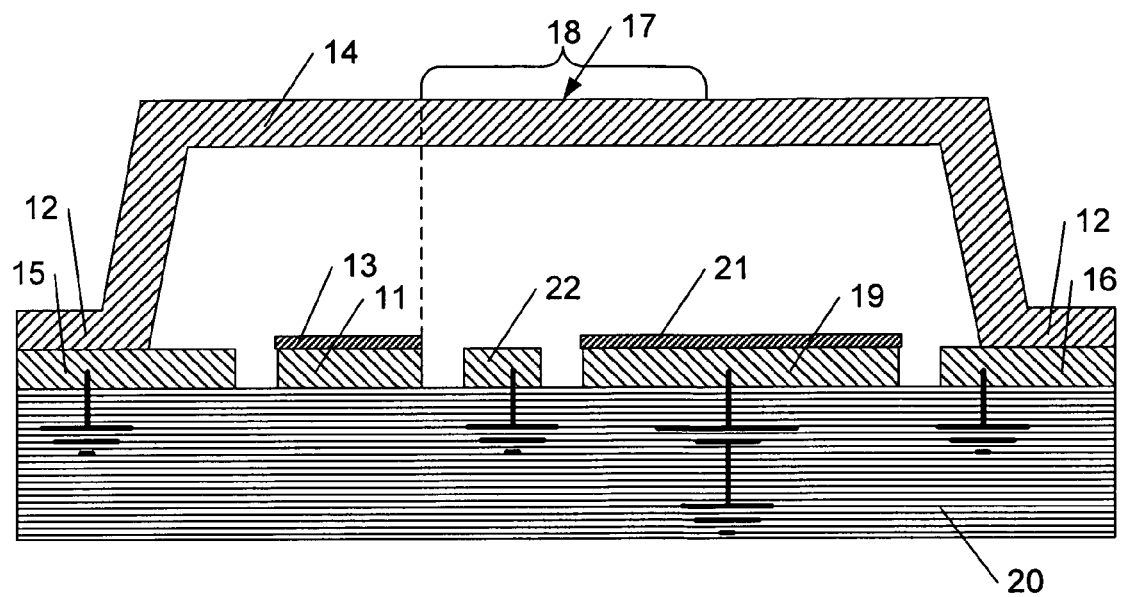
FIG. 3 shows a cross section of another device designed with the method, according to an example.

The example shown in FIG. 3 differs from that of FIG. 2 in that an actuation electrode 19 is provided in the principal actuation area. In use, DC voltage is applied to the actuation electrode 19 for actuating the collapsible portion 14 of the second conductor 12. Like the first conductor 11, the actuation electrode 19 is provided with a dielectric layer 21 for insulation purposes when the collapsible portion 14 is in the proximate position. The thickness of the dielectric layer 21 determines the capacitance in that state. The device may also comprise one or more further actuation electrodes, which may or may not be provided with a dielectric layer 13, 21 on top, depending on whether contact is made in the proximate state or not.

As shown in FIG. 3, the actuation electrode 19 extends up to the region 17 of maximum actuation liability, although this is not essential. As a result, the device of FIG. 3 is actuatable by applying substantially the minimum DC voltage difference over the second conductor 12 and the actuation electrode 19. Consequently, the device of FIG. 3 is actuatable at a lower DC voltage difference than the device of FIG. 2. In use, the DC voltage can be simultaneously applied to the first conductor 11 to enhance the stability in the proximate position.

Another difference in the device of FIG. 3 is that the first conductor 11 is a coplanar waveguide (CPW) signal line. The first conductor 11 is a central line, which in use, actually carries the RF signal and is flanked by ground planes 15, 22 which are connected to ground against interference.

Figure 4:
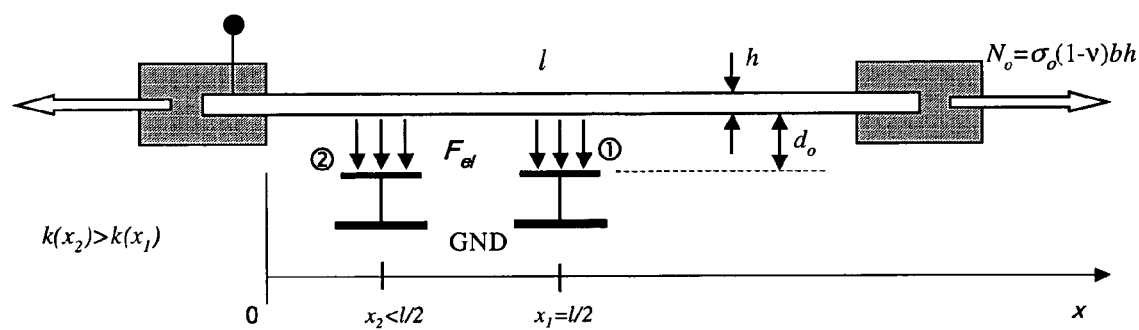
FIG. 4 shows a scheme of the theory behind the method, according to an example.

FIG. 4 schematically illustrates the main principle behind the method, by comparing the electrostatic actuation of a collapsible portion of a conductor at two different locations. At location 1 ($x=x_1=l/2$), i.e., the center of the portion, the actuation is more efficient than at location 2 ($x=x_2<l/2$), i.e., more towards the clamping edge, which is where the collapsible portion becomes supported. More efficient means that the stiffness $k(x)$ (="force applied at x"/"deflection at x") seen at $x=x_1$ is smaller than the stiffness seen at $x=x_2$: $k(x_1)<k(x_2)$. With stiffness is meant the resistance to actuation, i.e., the opposite of actuation liability.

Figure 5:
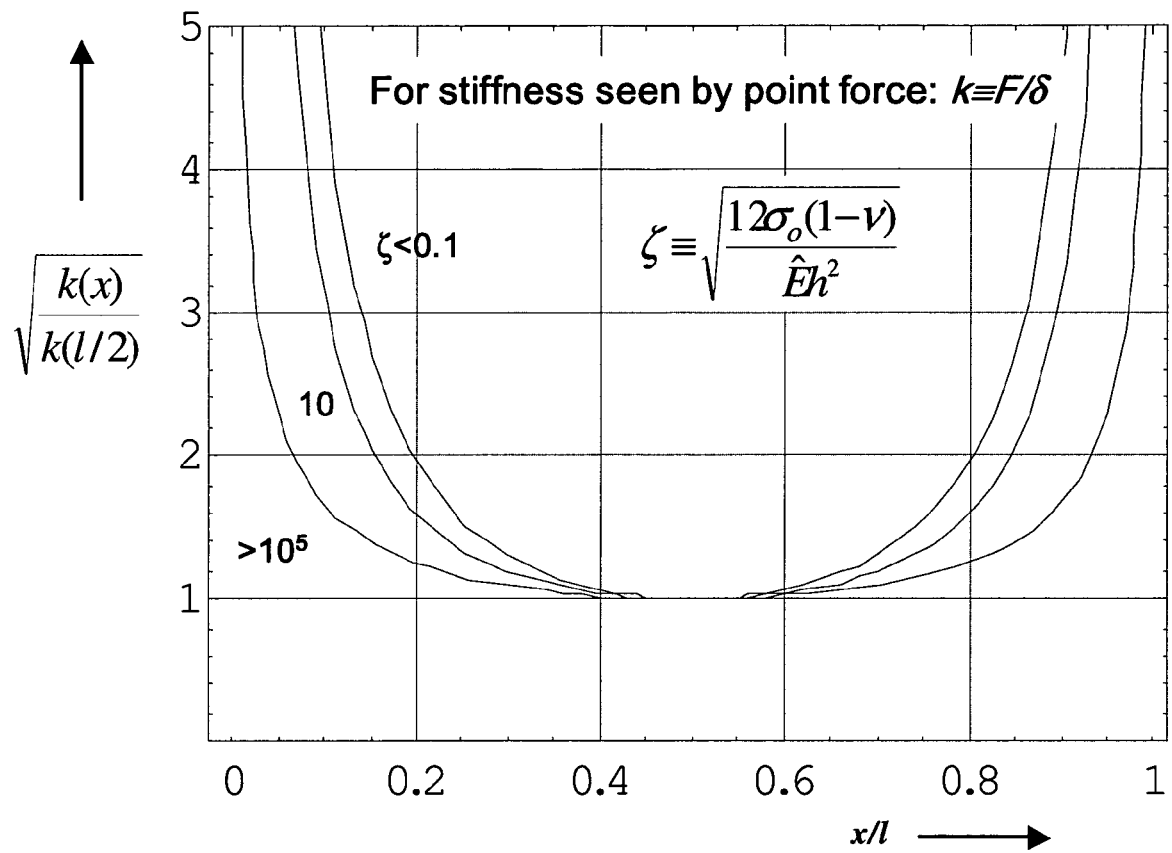
FIG. 5 is a graph that illustrates the relationship between a measure for stiffness and the position in a clamped beam.

FIG. 5 illustrates the variation of the normalized stiffness $k(x)/k(x=l/2)$ ($k(x)$="force applied at x"/"deflection at x") as a function of the position x along the length of the collapsible portion in FIG. 4 for different values of the stiffness ratio $\zeta$. The stiffness ratio $\zeta$ is defined as the ratio of the membrane stiffness (caused by the residual stress $\sigma_o$), and the bending (or flexural) stiffness and is a function of the residual film stress $\sigma_o$, Young's modulus E of the material, and the thickness h of the collapsible portion.

Figure 7:
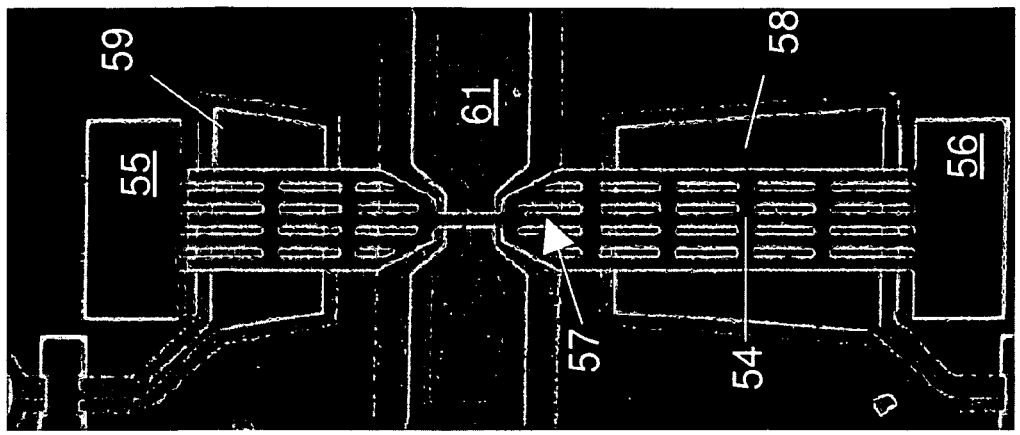
FIGS. 6 and 7 show photographs of devices designed with the method according to the invention, viewed from above.
Figure 6:
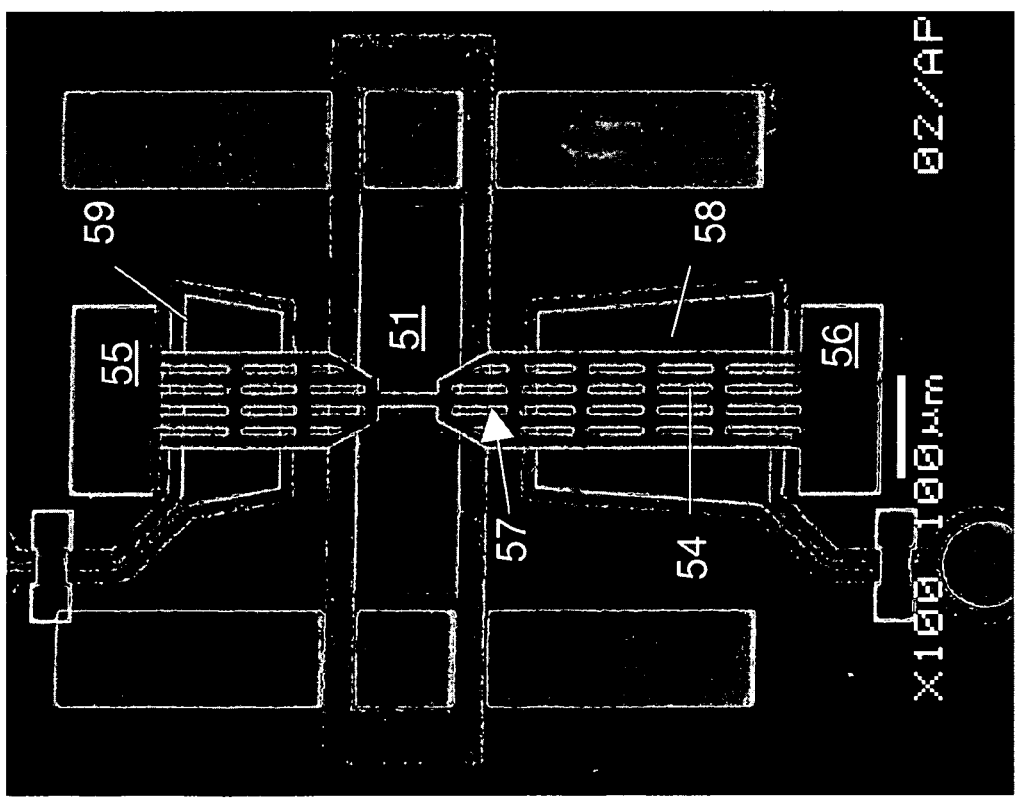

The devices shown in FIGS. 6 and 7 both have actuation electrodes 58, 59 on opposite sides of the first conductor 51, 61, so that a good stability in the proximate state or downstate is achieved. The lateral offset is again created by the position of the first conductor 51, 61, the region 57 of maximum actuation liability being again substantially in the middle of the armature 54. The armature 54 narrows over the first conductor 51, 61, which is the signal line, for decreasing the capacitance in the distant position and further reducing the risk of self-actuation. In the device of FIG. 7, also the signal line 61 narrows at the crossing for further increasing the capacitance.

Alternative examples of the device are shown in FIGS. 8-11. These devices also have the following features, which have already been described in great detail above and will therefore not be detailed here: the substrate 30, the first conductor 31 with the dielectric 33, the fixed supports 35, 36, the second conductor 32 with the collapsible portion or armature 34 and its region 37 of maximum actuation liability. The region 37 of maximum actuation liability again being substantially in the middle, the lateral offset is created by the position of the first conductor 31.

Figure 8:
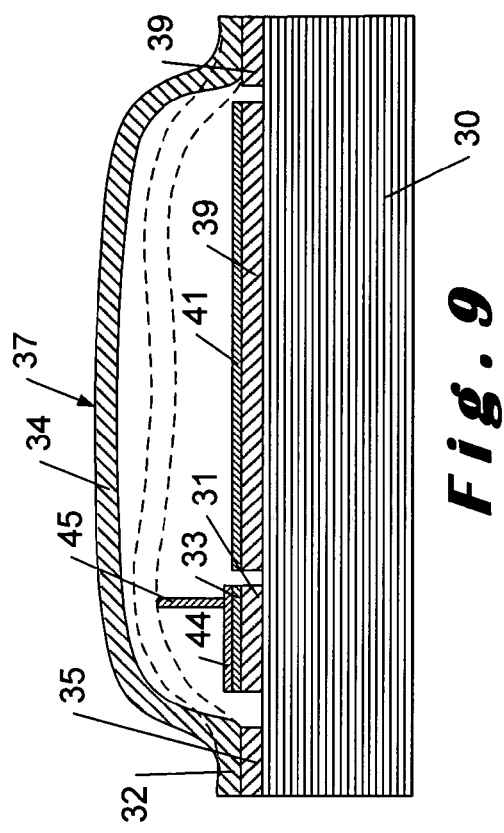

In FIG. 8, the first conductor 31 is flanked by actuation electrodes 39, 42, each having a dielectric 41, 43 on top. The actuation electrode 39 shown on the right side extends underneath the region 37 of maximum actuation liability, so that the device is actuatable at the minimum DC voltage.

Figure 9:
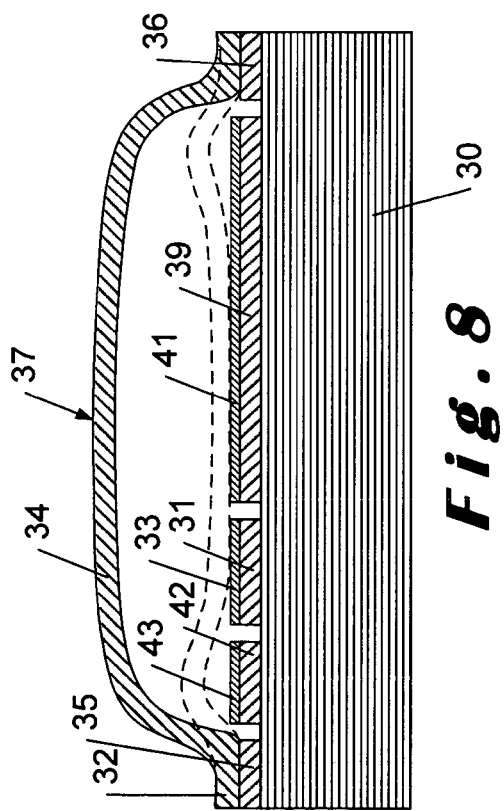

In FIG. 9, there is only one actuation electrode 39 and the first conductor 31 is provided with a floating contact 44 on top of its dielectric 33 for the collapsible portion 34. By using this floating contact, a more uniform dielectric field can be achieved in the downstate. For improving the contact between the floating contact 44 and the collapsible portion 34, a protruding element or so-called "bump" 45 is applied on top.

Figure 10:
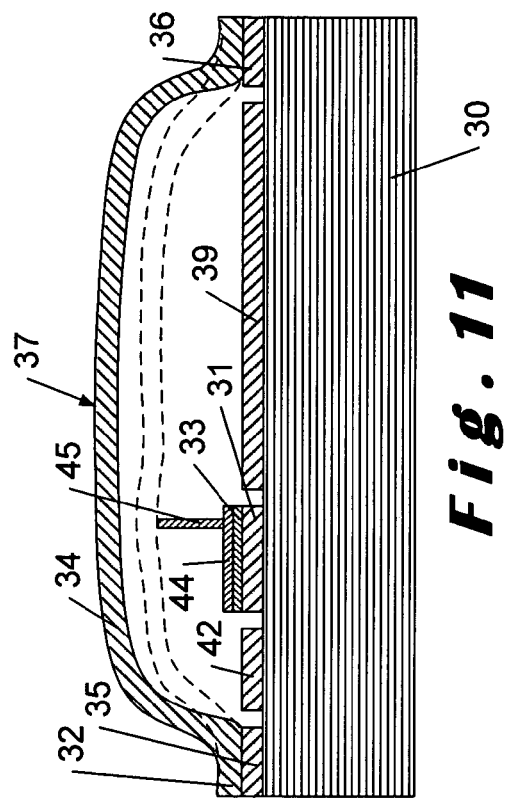

The device of FIG. 10 combines the devices of FIGS. 8 and 9: there are two actuation electrodes 42, 39 and the first conductor 31 is provided with the floating contact 44. The device of FIG. 11 differs from that of FIG. 10 in that the electrodes 42, 39 are not covered by dielectrics 43, 41, which implies that the collapsible portion 34 makes no contact with the electrodes 42, 39 in the proximate position.

Figure 11:
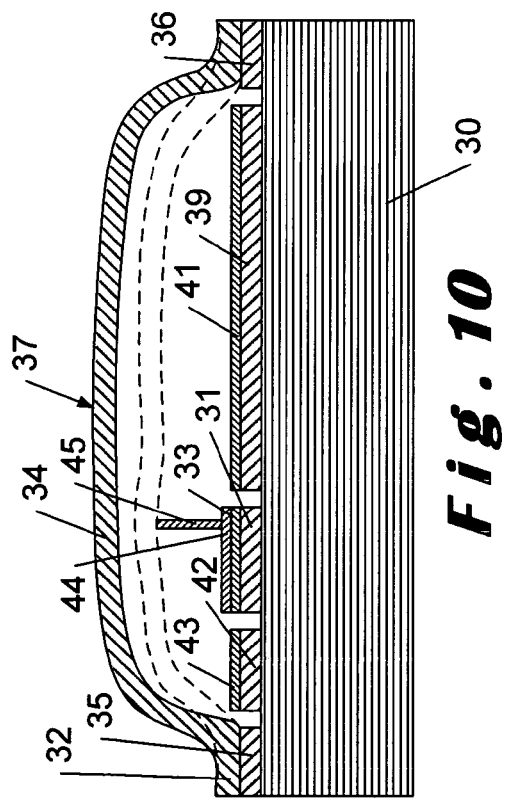

In FIGS. 9-11, the armature 34 and the floating electrode 44 may, for example, be formed out of the same material. The armature 34 and the floating electrode 44 may, however, also be formed out of different materials. In the latter case, stiction between the armature 33 and the floating electrode 44 in the downstate will be reduced.

The floating electrode 44 may be deposited by different suitable techniques, such as, for example, plating, sputtering, printing or spincoating, onto at least part of the dielectric layer 33. The floating electrode 44 may consist essentially of a conductive material such as, for example, a metal (e.g., Au, Al, or Cu), a semiconductor material (e.g., Si, Ge, SiGe, GaAs) or a conductive polymer.

Preferably, a low temperature process may be used in order not to affect the earlier deposited layers. The maximum allowed temperature depends on the type of materials used to form the dielectric layer 33 and/or the bottom electrode 31 and, preferably, may be less than 350° C. or less than 250° C.

The thickness of the floating electrode 44 may preferably be between 0.01 µm and 10 µm. More preferably, the thickness of the floating electrode 44 may be between 0.1 µm and 2 µm. Even more preferably, the thickness of the floating electrode 44 may be between 0.1 µm and 1 µm. Most preferably, the thickness of the floating electrode 44 may be between 0.1 µm and 0.3 µm.

The device shown in FIG. 12 has a so-called cantilever element 74 as a collapsible portion. Here, the first and second conductors 71, 72 together form an interruptable signal line. The free end of the cantilever element 74 is most sensitive to attraction forces in the principal actuation area (the orthogonal projection of the cantilever element on the plane of the first conductor 71) since it is furthest from the support 75 from which the cantilever element 74 extends. Hence, the region 77 of maximum actuation liability is located at the free end of the cantilever element 74.

The first conductor 71 is laterally offset from this region 77, leaving space for an actuation electrode 78. In other words, the first conductor 71 is located between the support 75 and the actuation electrode 78. The first conductor 71 and the actuation electrode 78 are each provided with dielectric layers 73, 79, which form contact surfaces for the cantilever element 74 in the proximate position. As shown in FIG. 12, the device is actuated by applying a DC voltage difference over the second conductor 72 and the actuation electrode 78. The first conductor 71 may be placed at the same potential as the electrode 78 for increasing stability in the downstate.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A method for fabricating a micro electromechanical device comprising a first conductor and a second conductor having a collapsible portion that in use is attracted by the first conductor as a result of an RF induced force, the method comprising in combination:

locating the first conductor in a plane; and locating the second conductor with at least its collapsible portion at a predetermined distance above the plane, wherein an orthogonal projection of the collapsible portion onto the plane defines a principal actuation area on the plane on which the first conductor extends;

wherein the collapsible portion is movable between a distant position further from the principal actuation area and a proximate position closer to the principal actuation area, the movement of the collapsible portion being actuatable by applying an attraction force within the principal actuation area;

wherein the collapsible portion shows a variable actuation liability in a longitudinal direction with a region of maximum actuation liability where the attraction force to be applied for actuation is a minimum over the whole principal actuation area; and wherein the first conductor is laterally offset by a predetermined distance from the region of maximum actuation liability, the predetermined distance being used such that a precondition is met, the precondition being a function of the attraction force that in use occurs between the first and second conductors and which the micro-electromechanical device has to be able to withstand.

2. The method of claim 1, wherein one of the first and second conductors is designed as an RF signal line for use in transporting RF signals while the other conductor is connected to ground.

3. The method of claim 1, wherein the first and second conductors are designed for together forming an interruptable RF signal line for use in transporting RF signals.

4. The method of the claim 1, further comprising locating an actuation electrode within the principal actuation area for actuating the collapsible portion by means of a DC voltage difference that is applied between the actuation electrode and the second conductor.

5. The method of claim 4, wherein the first conductor is laterally offset from a sub-region of the collapsible portion, and wherein the DC voltage difference to be applied for actuation is below a predetermined threshold.

6. The method of claim 5, wherein the predetermined threshold is above a DC equivalent value of the attraction force.

7. The method of claim 4, wherein the actuation electrode is the first conductor and no further actuation electrode is provided in the principal actuation area.

8. The method of claim 4, wherein the actuation electrode is a separate actuation electrode from the first conductor, and wherein the separate actuation electrode is located closer to the region of maximum actuation liability than the first conductor.

9. The method of claim 8, wherein the actuation electrode is located such that it extends underneath the region of maximum actuation liability.

10. The method of claim 4, wherein the actuation electrode is a first actuation electrode, further comprising locating a second actuation electrode separate from the first conductor within the principal actuation area, wherein the first and second actuation electrodes are located on opposite sides of the first conductor.

11. The method of claim 1, further comprising providing a dielectric layer on top of at least one of the first conductor and an actuation electrode located within the principal actuation area, wherein the dielectric layer has a predetermined thickness in view of a capacitance of the device with the collapsible portion in the proximate position.

12. The method of claim 11, further comprising providing a floating contact on top of at least one of the dielectric layers.

13. The method of claim 12, wherein the floating contact is provided with a protrusion extending towards the collapsible portion.

14. The method of claim 1, wherein the collapsible portion is a bridge element extending between two fixed supports.

15. The method of claim 14, wherein the bridge element has a substantially symmetrical structure with the region of maximum actuation liability in the middle between the two fixed supports, and wherein the first conductor is laterally offset from the middle.

16. The method of claim 14, wherein the bridge element has an asymmetrical structure with the region of maximum actuation liability laterally offset from the middle between the two fixed supports, and wherein the first conductor is located in the middle between the supports or laterally offset from the middle in opposite direction with respect to the offset of the region.

17. The method of claim 1, wherein the collapsible portion is a cantilever element extending from a single fixed support above the principal actuation area.

18. The method of claim 17, wherein the first conductor is located such that it extends through the principal actuation area in between the single fixed support and a separate actuation electrode that is located within the principal actuation area closer to the region of maximum actuation liability than the first conductor.

* * * * *